Nov. 30, 1926.
C. HARDY
1,609,118
ELECTRICAL CONDENSER MANUFACTURE
Filed Dec. 10, 1925
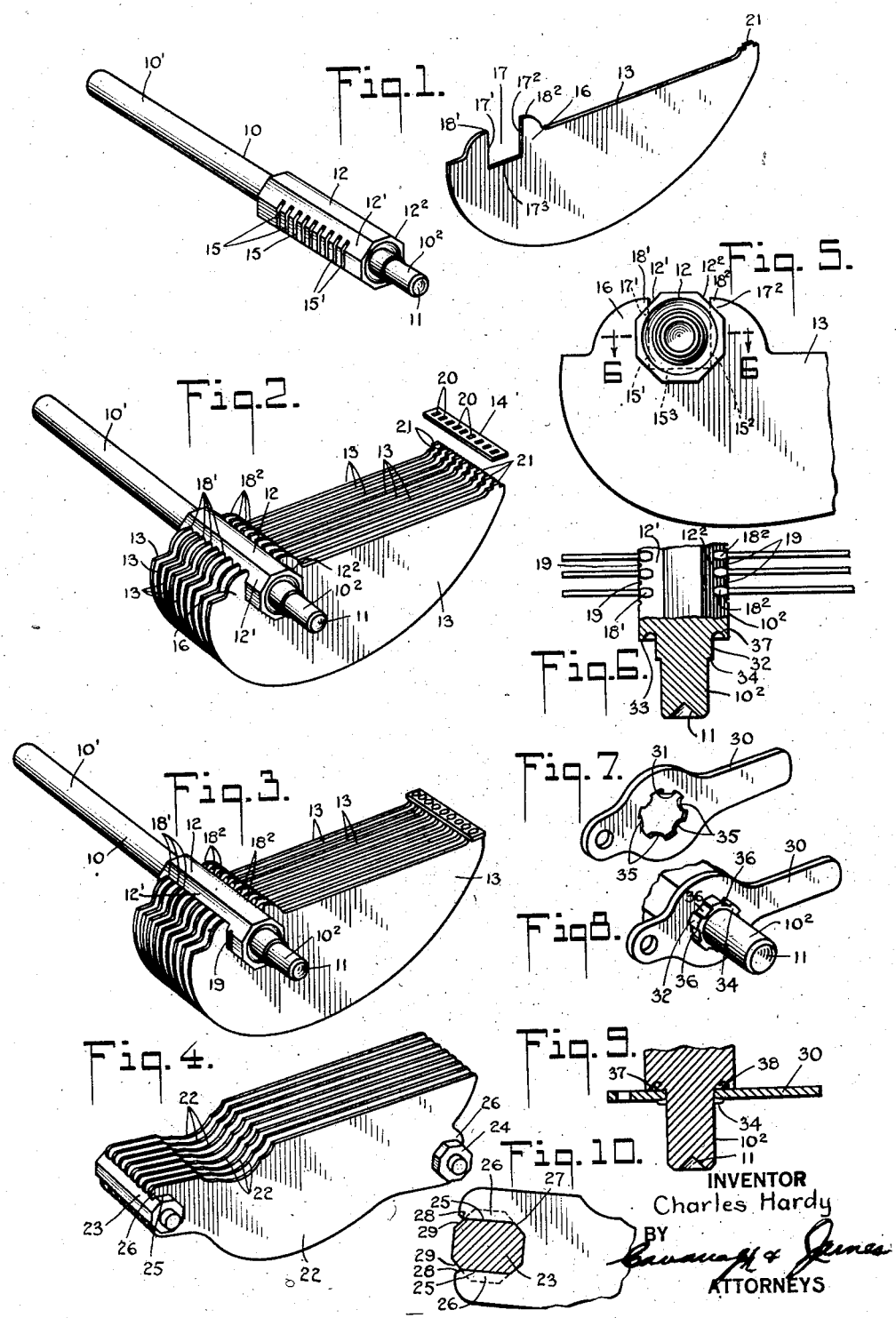
INVENTOR
Charles Hardy
BY
ATTORNEYS Patented Nov. 30, 1926.

1,609,118

UNITED STATES PATENT OFFICE.

CHARLES HARDY, OF NEW YORK, N. Y., ASSIGNOR TO AMSCO PRODUCTS, INC., OF NEW YORK, N. Y., A CORPORATION OF NEW YORK.

ELECTRICAL-CONDENSER MANUFACTURE.

Application filed December 10, 1925. Serial No. 74,471.

This invention relates to the manufacture of electrical condensers, and more particularly to the manufacture of variable air condensers; and has special reference to the provision of an improved variable air condenser of the rotor and stator type and to improved methods of making the same.

The prime desideratum of my present invention centers about the production of improvements in the art of manufacturing electrical condensers, and more specifically in the provision of an improved method of manufacturing the rotor and stator sections of the condenser whereby the parts may be effectively joined or united together by manufacturing steps which may be carried out with rapidity, facility and consequent economy of production, especially on a quantity production scale, to produce rotor and stator sections which are mechanically strong and durable and electrically efficient in operation.

A more specific principal object of the invention relates to the efficient manufacture of rotor and stator condenser sections in which the condenser plates are joined to plate supporting blocks or members by a dovetailing interengagement of the parts and by uniting the interengaged parts by means of simple and easily carried out riveting or swaging operations.

A further prime object of my present invention comprehends the provision of an improved method of joining or uniting the stop or motion-limiting member usually forming part of the rotor section to the rotor section so that the same is immovably fixed or rigidly held against displacement thereon, the method being carried out with a minimum of manufacturing operations.

To the accomplishment of the foregoing and such other objects as may hereinafter appear, my invention consists in the elements and their relation one to the other, as hereinafter described and sought to be defined in the claims; reference being had to the accompanying drawings, which show the preferred embodiment of my invention, and in which:

Fig. 1 is a perspective view showing parts of the condenser rotor prior to assembly, Fig. 2 is a perspective view showing the rotor parts in embryo assembled relation prior to the step of uniting the parts together, Fig. 3 is a perspective view of the condenser rotor showing the same in completed assembled relation after the step of joining or uniting the parts together, Fig. 4 is a perspective view of the condenser stator in completed assembled relation, Fig. 5 is a detail and enlarged view depicting the manner in which the plates of the condenser are joined or united to the plate supporting blocks of the condenser, Fig. 6 is an enlarged detail view thereof taken in cross-section in the plane of the line 6—6, Fig. 5, Figs. 7, 8 and 9 are perspective views of sequential operations depicting the manner of joining a rotor stop member to the condenser rotor shaft, and Fig. 10 is an enlarged detail view of a stator part showing the method of and means for uniting a stator plate to a plate supporting block.

Referring now more in detail to the drawings, and first having reference to Figs. 1–3 and 5 thereof, I show the manner of making and assembling the rotor parts to form a rotor unit and employing certain principles of my present invention. As shown in Fig. 3 of the drawings, the assembled rotor unit comprises a shaft 10 having opposite ends 10′ and 10² adapted to be journalled in end plates (not shown) of the condenser, the terminal of the shaft end 10² being preferably recessed as at 11 for receiving a ball bearing or the like, the said shaft 10 having an intermediate portion comprising a plate supporting block 12 which fixedly carries in spaced relation the plurality or set of condenser plates 13, 13, the said condenser plates being also held in spaced relation by means of a spacing member or strap 14 fixed to the condenser plates.

As heretofore mentioned, one of the prime objects of my present invention centers about the provision of an improved method of manufacturing the rotor section of the condenser whereby the parts may be effectively joined or united together by manufacturing steps which may be carried out with great rapidity, facility, and a consequent economy of production, especially on a quantity production scale, to produce a rotor section which is mechanically efficient.

To accomplish these and other ends, the plate supporting block 12 and the condenser plates 13, 13 are designed and constructed to be joined by a dove-tailing interengagement of the parts and to be permanently united by a simple operation of riveting or swaging the plates onto the block. More particularly, the plate supporting block 12 is provided with a series of transverse grooves 15, 15 arranged longitudinally of the block, and each of the condenser plates 13 is cut or fashioned so as to be formed with a hub portion 16 provided with a cut-out 17 open at one side for receiving the block 12, the edge 17' and 17² of the cut-out defining tenon members receivable by the transverse grooves of the block with a dovetailing interengagement, as clearly shown in Figs. 2 and 5 of the drawings. In the preferred form of construction, the transverse grooves 15 of the rotor plate supporting block 12 are cut along three sides of the block to provide the set of grooves 15', 15² and 15³, as shown particularly in Fig. 5 of the drawings, these grooves cooperating with the tenon edges 17' and 17² referred to, and with a third edge of the cut-out 17 designated as 17³, the construction being such that the plates may be readily inserted or slipped onto the block with the grooves and tenon members in dovetailing interengagement, the grooves and tenon members being non-circular in cross-section whereby the plates are held against rotation on the plate supporting block.

To effect rapid and efficient permanent joining of the plates to the block, the block 12 is provided with one or more longitudinal faces such as 12' and 12², and the tenon members 17' and 17² of each plate are contoured or fashioned so as to have free ends designated respectively as 18' and 18² which extend proximately beyond the said longitudinal block faces 12' and 12² when the plates are mounted or assembled on the plate supporting block, as clearly shown in Figs. 2 and 5 of the drawings, the construction being such that the tenon ends may be readily flattened over the block faces by means of the light blow of a suitable blade-shaped hammer. Preferably the longitudinal faces 12' and 12² are arranged to intersect the tenon members at acute angles, as clearly portrayed in Fig. 5 of the drawings, so that a comparatively light blow of the hammer or forming tool is sufficient to flatten, swage or rivet the tenon ends 18' and 18² over said faces, the faces acting as anvils in the swage-riveting process. A comparison of Figs. 2 and 3 of the drawings shows the slight amount of extension of the tenon ends beyond the block faces which is necessary and the comparative ease with which the extending ends may be swaged or riveted over the inclined block faces, Fig. 2 showing the assembly prior to the swaging process and Fig. 3 showing the same subsequent to the swaging process. The effect of swaging the tenon ends is also indicated in Fig. 6 of the drawings, the said tenon ends 18' and 18² being there shown as flattened over the adjoining or contiguous block faces.

By means of this construction and mode of assembly, it will be seen that the plates may be readily mounted or assembled on the rotor shaft by simply inserting the tenon members in the socket forming grooves of the shaft block, the said plates being fixed against rotation on the shaft and arranged in parallel spaced relation; and that the said plates may be non-removably joined to the shaft block by subjecting the same to a simple swage-riveting step. In practice the condenser plates are arranged in a suitable form press in spaced relation, and the condenser shaft is inserted in the channel provided by the tenon members, after which a pair of blade-shaped hammer members forming part of the press are moved into engagement with the free tenon ends with a comparatively light impact or blow. After this operation, the embryo assembly may be subjected to a staking operation, whereby a plurality of indentations or dents such as 19, 19 are produced in opposite side walls of the shaft block 12, as shown in Figs. 3 and 6 of the drawings. This staking operation assists in maintaining the plates rigidly in spaced relation, although it is found that the dovetailing interengagement between the parts and the swage-riveting of the tenon ends are sufficient to stably maintain the plates in properly spaced relation.

The condenser plates 13 may obviously be made of any desired contour or configuration, and in the construction exemplified, these plates are shaped or formed to produce in cooperation with the stator section a straight-line frequency calibration curve. The rotor plates are therefore elongated in one direction and assume generally a heart-shaped configuration; and with a plate formation of this design, it is desirable to provide additional means for maintaining the plates in spaced relation. To these ends, therefore, I provide the spacing strap 14 heretofore referred to, having a plurality of aligned perforations 20 which receive a plurality of similarly aligned teats or nibs 21, 21 formed integrally with the condenser plates 13, the said nibs being given a configuration so as to extend slightly beyond the upper face of the strap 14 when the same are received by the strap perforations 20, the construction being such that the extended ends can thereafter be swaged or riveted over the said face of the strap 14, as is clearly shown in Fig. 3 of the drawings, Fig. 2 showing the parts prior to the mounting of the spacing strap on the condenser plates, and Fig. 3 showing the same after the nibs are swaged over the strap face. In the preferred construction, the strap 14 is arranged relatively to the plate supporting block 12 so that the riveting of the strap may be accomplished simultaneously with the riveting of the tenon ends of the plates over the faces of the shaft block 12. This will be apparent from a consideration, for example, of Fig. 3 of the drawings, and it will be evident that the press may be provided with three forming elements which are moved in one operation with a riveting impact on the parts to be joined together.

Referring now to Figs. 4 and 10 of the drawings, I show some of the foregoing principles applied to the assembling of the stator section of the condenser, the said stator section comprising a plurality of stator plates 22, 22 adapted in the completed assembly to interleave with the plates 13 of the rotor, the said stator plates being spacedly mounted on a pair of plate supporting blocks 23 and 24 each having preferably an octagonal cross-sectional configuration similar to the rotor block 12, and each of these stator blocks is also slitted or cut transversely along the length of the block with a plurality of socket forming grooves 25, 25 for receiving the tenon members 26. 26 which are defined by the edges or walls of the cut-out 27 formed in each plate. In the stator structure, the blocks are grooved preferably at opposite walls thereof, and the cut-out 27 in each plate is contoured to accommodate or fit the grooved block, as clearly shown in Fig. 10 of the drawings. The free ends 28, 28 of the tenon members 26, 26 also extend proximately beyond longitudinal faces 29, 29 of a block such as 23 (see Fig. 10), and these ends may be swage-riveted over the block face, as shown in Figs. 4 and 10 of the drawings, in a manner similar to that heretofore described in connection with the rotor assembly.

As heretofore referred to, a further prime object of my present invention relates to the provision of an improved method of joining or uniting the stop or motion-limiting member usually forming part of the rotor section to the rotor section so that the same is immovably fixed or rigidly held against displacement thereon. In preferred types of condenser structures, stop or motion-limiting means are usually provided to limit the rotation of the condenser rotor to a range of about 180°, and such means customarily comprises a stop member fixed to the rotor shaft cooperating with a stop element mounted on a stationary part of the condenser assembly. In the adjustment of the condenser in use, the parts of the limiting means are ofttimes caused to engage with a jar or blow which results in incremental displacements of the stop member on the rotor shaft or a loosening of such stop member, and as a consequence the range of condenser adjustment is undesirably varied. The attachment or joining of these stop members to the rotor sections so that they may be permanently fixed against displacement on the rotor shaft and function properly in use has been attended with considerable manufacturing difficulty, various operating steps being required to effect an efficient union of the parts. The present invention therefore contemplates the utilization of method steps by means of which the disadvantages heretofore found in manufacturing practice are obviated and by which stop members are produced which are permanently joined against displacement on the rotor shaft.

The steps of the process by which the improved results are achieved are depicted sequentially in Figs. 6-9 of the drawings, Fig. 6 showing the rotor shaft 10 construction prior to the attachment of the stop member thereto, Fig. 7 showing the stop member in detached condition, and Figs. 8 and 9 showing successive steps in joining the stop member to the rotor shaft. Generically considered, the method of keying or affixing the stop member to the rotor shaft consists in providing a stop member generally designated as 30, which when applied to the rotor shaft end $10^2$ acts or serves as a cutting instrument or tool for cutting a portion of the shaft end in conformity with a shaft receiving opening 31 provided in the stop member.

More specifically, to accomplish the desired results the stop member 30, which is made of a metal harder than the shaft metal, is provided with the opening 31 which differs in cross-sectional configuration from that of a shaft portion 32 having a dimension less than that of the block 12 but slightly greater than the shaft end $10^2$, the reduced portion 32 and the block 12 defining an abutment shoulder 33, while the reduced portion 32 and the shaft end $10^2$ define therebetween a flange portion 34, as shown particularly in Fig. 6 of the drawings. The shaft portion 32 is preferably circular, being turned down in a lathe for simplicity of manufacture, and the shaft receiving opening 31 differs in configuration from the shaft portion 32 by the provision of one, and preferably a plurality of circumferentially disposed projections 35, 35 which define key elements, the said key elements functioning as cutting instruments for excising metal from the reduced shaft portion 32 to produce a plurality of key-ways 36, 36, as clearly shown in Fig. 8 of the drawings, when the stop member 30 is forced onto the shaft and against the abutment shoulder 33.

Preferably the abutment shoulder 33 is chamfered to produce an annular channel 37, this channel serving as a depository or receptacle for the metal cut from the shaft portion 32, as is shown at 38 in Fig. 9 of the drawings.

By means of this construction, it will be seen that the stop member 30 may be blanked or cut from sheet metal, and the same forced onto the circular or cylindrical shaft in a suitable press, the mating keys and keyways being obtained during this step for producing a stop member which is immovable and held rigidly in position against rotation or other displacement on the condenser shaft. Although the metal of the shaft portion 32 is spread during the operation sufficiently to hold the stop member 30 against axial displacement on the shaft, it is preferred to swage the flange portion 34 over the exposed face of the stop member 30, as clearly shown in Fig. 9 of the drawings, and in this way prevent axial as well as rotatable displacement of the stop member.

The method of manufacturing the condenser rotor and stator sections in accordance with the principles of my invention and the many advantages thereof and of the resulting condenser construction will in the main be fully apparent from the above detailed description thereof. It will be further apparent that numerous changes in the structural details or in the carrying out of the steps of the method may be made without departing from the spirit of the invention. It will further be obvious that the steps of the method may be practiced in part for accomplishing the various advantages outlined, and that other of the steps may be applied more broadly in other relations. For example, it will be apparent that by reason of the double plate supporting elements employed for the stator, it may suffice to unite the plates to the stator supports without the swage-riveting of the tenon members, and that the blocks or posts may be staked for accomplishing the desired end. It will also be obvious that the longitudinal faces of the plate supporting block may be arranged at any other angle than that shown in the preferred construction, the inclination or angularity shown being preferred because the same permits of the swaging or riveting step being carried out with a minimum of effort in the operation of the riveting press.

It will be also manifest that the tenon defining walls of the cut-out portions of the plates may be given any desired contour, it being preferred that the said contour be such that the plates are held non-rotatably in the stator or rotor plate supporting block. It will be also obvious to those skilled in the art that the method of keying or joining the stop member to the rotor shaft is of general application, and that the steps of the method may be carried out in other relations to unite a metallic member to a metal shaft circular in cross-section, all as defined in the appended claims.

I claim:

1. In an electrical condenser, the combination of a plate supporting block and a set of condenser plates carried by and joined to the block comprising a plate supporting block having transverse grooves spaced longitudinally of the block, a plurality of condenser plates each formed with a cut-out open at one side for receiving the block, edges of said cut-out defining tenon members receivable by the transverse grooves of the block with a dovetailing interengagement, the free ends of said tenon members extending proximately beyond a longitudinal face of said block, the said tenon ends being flattened over said block face.

2. In an electrical condenser, the combination of a plate supporting block and a set of condenser plates carried by and joined to the block comprising sets of transverse grooves spaced longitudinally of the block, a plurality of condenser plates each formed with a cut-out open at one side for receiving the block, the said cut-out having a depth substantially equal to the thickness of the block, a plurality of edges of said cut-out defining tenon members receivable with a dovetailing interengagement by a set of transverse grooves in the block, the tenon members and grooves being non circular whereby the plates are held against rotation on the block, the said tenon members having ends at the open side of the cut-out which extend proximately beyond a longitudinal face of said block, the said tenon ends being swage-riveted over said block face.

3. In an electrical condenser, the combination of a plate supporting block and a set of condenser plates carried by and joined to the block comprising transverse grooves spaced longitudinally of the block, a plurality of condenser plates each formed with a cut-out open at one side for receiving the block, the edges of the cut-out defining tenon members receivable by the grooves of the block with a dovetailing interengagement, the said block having longitudinal faces intersecting the tenon members at acute angles and the free ends of the said tenon members extending proximately beyond said block faces, the said tenon members being swage-riveted over said block faces.

4. In an electrical condenser, in combination, a series of transverse grooves, a plurality of condenser plates formed to provide tenon members receivable by said grooves with a dovetailing interengagement, the said tenon members having free ends extending proximately beyond a longitudinal face of said block, the said tenon ends being flattened over said block face, and a spacing member for holding said plates in spaced relation consisting of a strip having perforations receiving nibs formed in said plates, the spacing member being secured to the plates by riveting the nibs over the spacing member.

5. In combination, a metal shaft and a metallic member keyed to the shaft, the said metallic member being made of a metal harder than the shaft metal and being provided with a shaft receiving opening differing in cross-sectional configuration from that of the shaft by the provision of a means defining a key element, the said shaft having a key-way cut therein for mating with said key element, said key-way being cut by the key element when said member is forced onto the shaft.

6. In combination, a metal shaft and a metallic member keyed to the shaft, the said metallic member being made of a metal harder than the shaft metal and being provided with a shaft receiving opening differing in cross-sectional configuration from that of the shaft by the provision of a plurality of circumferentially disposed projections defining key elements, the said shaft having key-ways cut therein for mating with said key elements, said key-ways being cut by the key elements by the forcing of said member onto the shaft.

7. In an electrical condenser, in combination, a metal condenser shaft and a metallic stop member keyed to the shaft, the said metallic stop member being made of a metal harder than the shaft metal and being provided with a shaft receiving opening differing in cross-sectional configuration from that of the shaft by the provision of a projection defining a key element, the said shaft having a key-way mating with said key element, said key-way being cut by the key element by the forcing of said stop member onto the shaft.

8. In combination, a metal shaft and a metallic member keyed to the shaft, said shaft having enlarged and reduced portions meeting in an abutment shoulder, the said metallic member being made of a metal harder than the shaft metal and being provided with a shaft receiving opening differing in cross-sectional configuration from that of the reduced portion of the shaft by the provision of a means defining a key element, the said reduced shaft portion having a key-way cut therein for mating with said key element, said key-way being cut by the key element when said member is forced onto the shaft and against said abutment shoulder.

9. In combination, a metal shaft and a metallic member keyed to the shaft, said shaft having enlarged and reduced portions meeting in an abutment chamfered shoulder, the said metallic member being made of a metal harder than the shaft metal and being provided with a shaft receiving opening differing in cross-sectional configuration from that of the reduced portion of the shaft by the provision of a means defining a key element, the said reduced shaft portion having a key-way cut therein for mating with said key element, said key-way being cut by the key element when said member is forced onto the shaft and against said abutment shoulder.

10. In combination, a metal shaft and a metallic member keyed to the shaft, said shaft having enlarged and reduced portions meeting in an abutment shoulder, the said metallic member being made of a metal harder than the shaft metal and being provided with a shaft receiving opening differing in cross-sectional configuration from that of the reduced portion of the shaft by the provision of a means defining a key element, the said reduced shaft portion having a key-way cut therein for mating with said key element, said key-way being cut by the key element when said member is forced onto the shaft and against said abutment shoulder, the outer end of said reduced shaft portion being swaged over said member.

11. In combination, a metal condenser shaft and a metallic stop member keyed to the shaft, said condenser shaft having enlarged and reduced portions meeting in a chamfered abutment shoulder, the said metallic member being made of a metal harder than the shaft metal and being provided with a shaft receiving opening differing in cross-sectional configuration from that of the reduced portion of the shaft by the provision of a means defining a plurality of key elements, the said reduced shaft portion having key-ways cut therein for mating with said key elements, said key-ways being cut by the key elements when said member is forced onto the shaft and against said abutment shoulder, the cut metal being deposited in the chamfered shoulder, the outer end of said reduced shaft portion being swaged over said stop member.

12. The method of making an electrical condenser which consists in producing a series of transverse grooves in a plate supporting block, in shaping condenser plates each with a cut-out open at one side so that the edges of the cut-out define tenon members, in assembling the plates on the block by dovetailing the tenon members with the grooves, the parts being fashioned so that the free ends of the tenon members project proximately beyond a longitudinal face of said block, in then riveting the free tenon ends on said block face, and in additionally holding said plates in spaced relationship by forming the plates with integral nibs, receiving the nibs in a spacing member provided with nib receiving perforations, and in riveting the nibs over and onto said spacing members.

13. The method of making an electrical condenser which consists in producing a series of transverse grooves in a plate supporting block, in shaping condenser plates each with a cut-out open at one side so that the edges of the cut-out define tenon members, in assembling the plates on the block by dovetailing the tenon members with the grooves, the parts being fashioned so that the free ends of the tenon members project proximately beyond a longitudinal face of said block, in then riveting the free tenon ends on said block face, and in additionally holding said plates in spaced relationship by forming the plates with integral nibs, receiving the nibs in a spacing member provided with nib receiving perforations, and in riveting the nibs over and onto said spacing members simultaneously with the riveting of the free tenon ends over the block face.

14. The method of keying a metallic member to a metal shaft circular in cross-section which consists in cutting a shaft receiving opening in a metallic member made of metal harder than the shaft metal, the said opening having a cross-sectional configuration differing from that of the shaft by the provision of a projection defining a key element, and in then forcing the member onto the shaft so that the edges of the key element act as a cutting tool to cut a key-way in the shaft for mating with said key element.

15. The method of keying a metallic member to a metal shaft circular in cross-section which consists in cutting a non-circular shaft receiving opening in a metallic member made of metal harder than the shaft metal. the said opening having a lateral dimension smaller than that of the shaft, and in then forcing the member onto the shaft so that the edges or walls of said opening act as a cutting tool to cut the shaft metal to conform to the shape of said opening.

16. The method of keying a metallic member to a metal shaft circular in cross-section which consists in providing a shaft receiving opening in a metallic member made of metal harder than the shaft metal, the said opening having a cross-sectional configuration differing from that of the shaft by the provision of a plurality of circumferentially disposed projections defining key elements, and in then forcing the member onto the shaft so that the key elements act as a cutting tool to cut mating key-ways in the shaft.

17. In electrical condenser manufacture, the method of keying a metallic stop member to a metal condenser shaft which consists in cutting a shaft receiving opening in a metallic stop member made of metal harder than the shaft metal, the said opening having a cross-sectional configuration differing from that of the shaft by the provision of a projection defining a key element, and in then forcing the member onto the shaft so that the edges of the key element act as a cutting tool to cut a key-way in the shaft for mating with said key element.

18. In electrical condenser manufacture, the method of keying a metallic stop member to a metal condenser shaft circular in cross-section which consists in producing a shaft receiving opening in a metallic member made of metal harder than the shaft metal, the said opening having a cross-sectional configuration differing from that of the shaft by the provision of a plurality of circumferentially disposed projections defining key elements, and in then forcing the member onto the shaft so that the said key elements act as a cutting instrument to cut mating key-ways in the shaft.

19. The method of keying a metallic member to a metal shaft which consists in cutting a shaft receiving opening in a metallic member made of metal harder than the shaft metal, the said opening having a cross-sectional configuration differing from that of the shaft by the provision of a projection defining a key element, and in then forcing the member onto the shaft so that the edges of the key element act as a cutting tool to cut a key-way in the shaft for mating with said key element.

Signed at New York city in the county of New York and State of New York, this 8th day of December, A. D. 1925.

CHARLES HARDY.